W. WENDERHOLD.
VARIABLE SPEED TRANSMISSION DEVICE.
APPLICATION FILED APR. 28, 1917.

1,329,867.

Patented Feb. 3, 1920.
4 SHEETS—SHEET 1.

William Wenderhold
INVENTOR.

W. WENDERHOLD.
VARIABLE SPEED TRANSMISSION DEVICE.
APPLICATION FILED APR. 28, 1917.
1,329,867.
Patented Feb. 3, 1920.
4 SHEETS—SHEET 3.
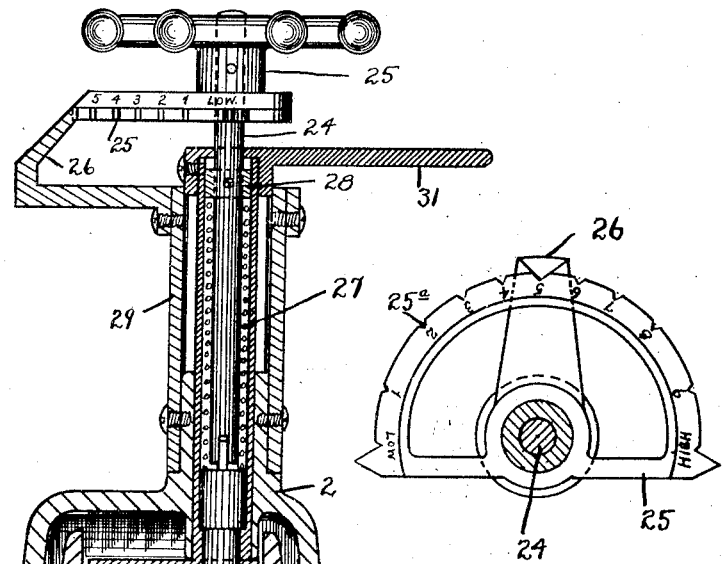
Fig. 3.
Fig. 4.
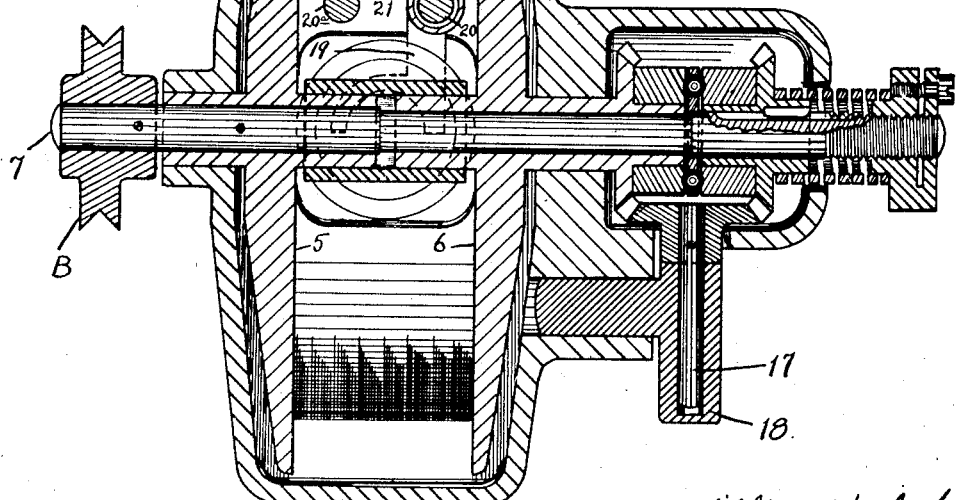
William Wenderhold
INVENTOR.

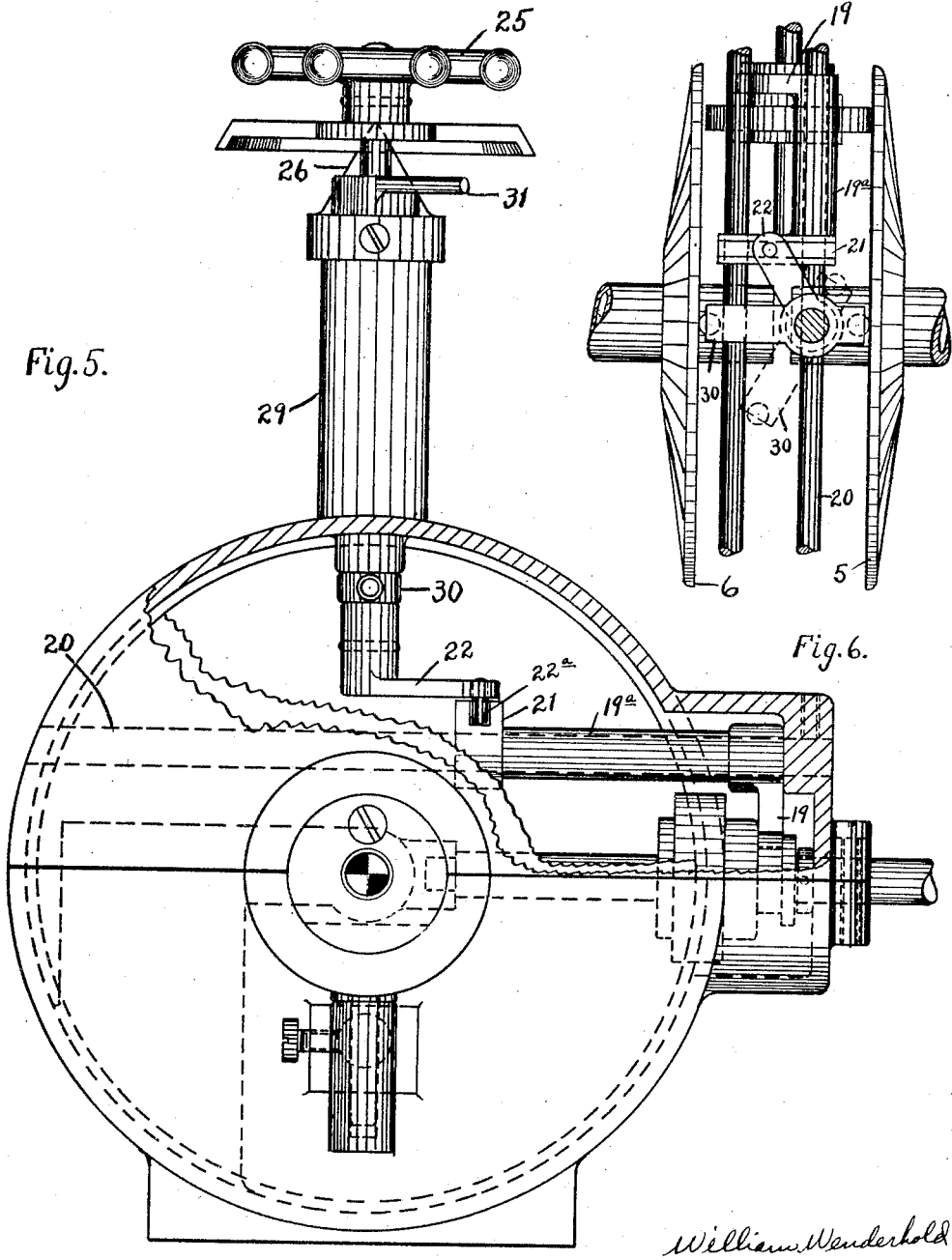

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

VARIABLE-SPEED-TRANSMISSION DEVICE.

1,329,867. Specification of Letters Patent. Patented Feb. 3, 1920.

Application filed April 28, 1917. Serial No. 165,082.

*To all whom it may concern:*

Be it known that I, WILLIAM WENDERHOLD, a citizen of the United States, residing at New York city, in the county and State of New York, have invented certain new and useful Improvements in Variable-Speed-Transmission Devices, of which the following is a clear, full, and exact description.

The object of this invention is to provide a device that will transmit rotary power without loss of power and enable the operator to change the number of rotations instantly.

Another object is to provide a variable speed device that has no end thrust against its support bearings.

Another object is to provide a device that will transmit speed under variable ratio at variable speed where high power is essential.

Another object and feature of my invention is to operate the device quickly and to secure and hold the speed desired and to engage and disengage the driving source instantly without change of speed.

An often employed and well known principle is to have a disk and a pulley. The disk is usually in contact on its side or annular surface with the periphery of a pulley, which is moved to and from the center of the disk, thereby varying the speed of the driven member. This universally employed device, wherever employed, has never given absolute satisfaction, the fundamental mechanical error being the excess of great pressure against all bearings, short life, slipping and loss of power.

My device completely eliminates the afore-mentioned faults in a simple manner, and with mechanically perfect principles by employing two disks, the pressure of one being drawn through the other upon a thrust ball bearing, all entirely self-contained, and all pressure charging upon the periphery of a pulley on opposite sides, thereby eliminating all end thrust upon the support bearings and providing a double grip upon the periphery of the pulley.

Referring to the drawings:

Fig. 3 is a vertical cross-section;

Fig. 4 is a partial detail of Fig. 3;

Fig. 5 is a side elevation, partly in cross-section;

Fig. 6 is a top view of the interior of my device.

Figure 1:
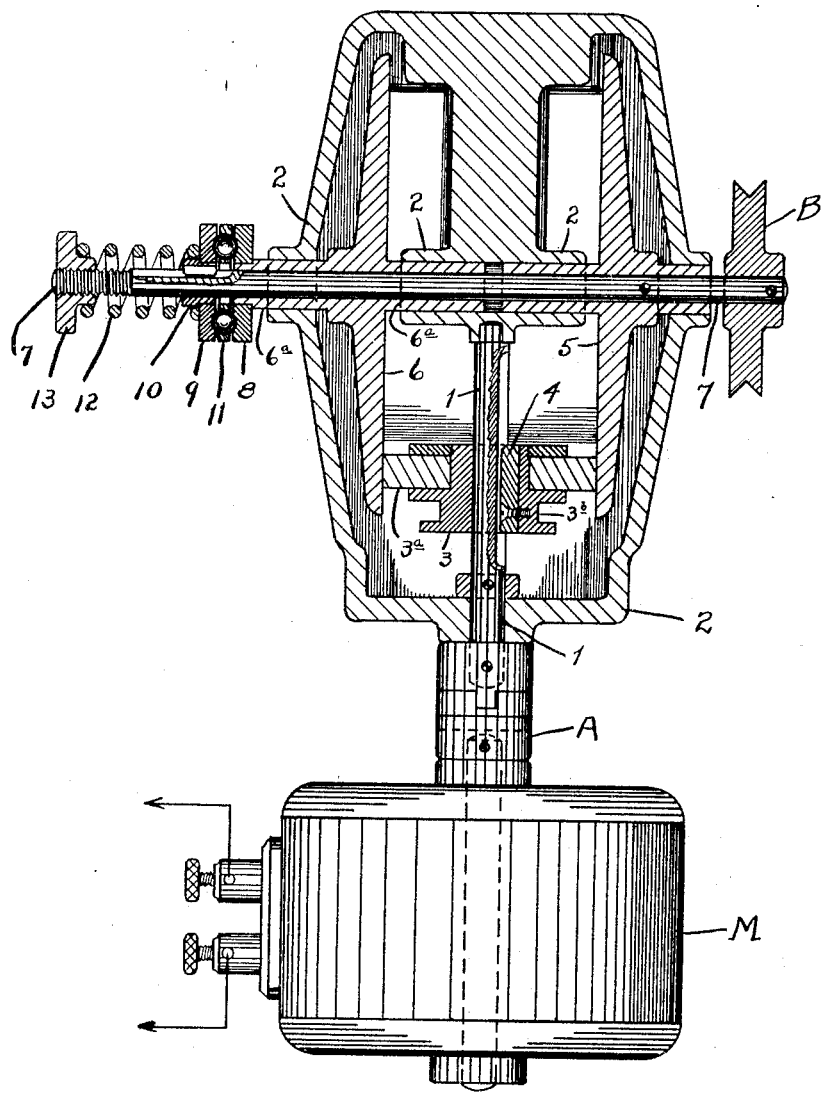
Figure 1 is a horizontal cross-section through one type of my device.

As illustrated in the drawing, M is an electric motor upon the axis of which motor is fastened a coupling A, part of which coupling is also fastened upon shaft 1 of my device, which is mounted in the support casing 2. A sliding pulley 3 is mounted upon shaft 1 and driven thereby by means of a key 4 in the pulley 3 and a key-way or groove in shaft 1. $3^a$ is a friction drive material securely pressed and fastened upon pulley 3. The friction disks 5 and 6 are in contact with the periphery of $3^a$ and driven thereby. The disk 5 is securely fastened to shaft 7. Disk 6 is loosely mounted and has a hole slightly larger than the shaft 7, so that it is not in contact with the shaft, but the tubular extensions $6^a$ are supported by the casing 2, and form the only rigid bearing for disk 6. On one end of said tubular extension $6^a$ of disk 6 is mounted a thrust ball race 8. The other ball race 9 is mounted upon a sleeve 10, which sleeve is slidably mounted upon shaft 7 by means of a key and keyway, and is held securely in contact with the balls 11 by the compression spring 12, adjustable by the knurled knot 13. The pressure exerted upon the ball race constitutes the pressure of the two disks 5 and 6 upon the friction drive members 3 and $3^a$. Since the disks do not thrust upon the casing bearings and only upon member $3^a$, the device runs as free and easily as a belt, and by shifting the pulley 3 upon shaft 1 the speed of shaft 7 is varied. Upon one end of shaft 7 I mount a pulley B from which any machine or other device may be driven.

Figure 2:
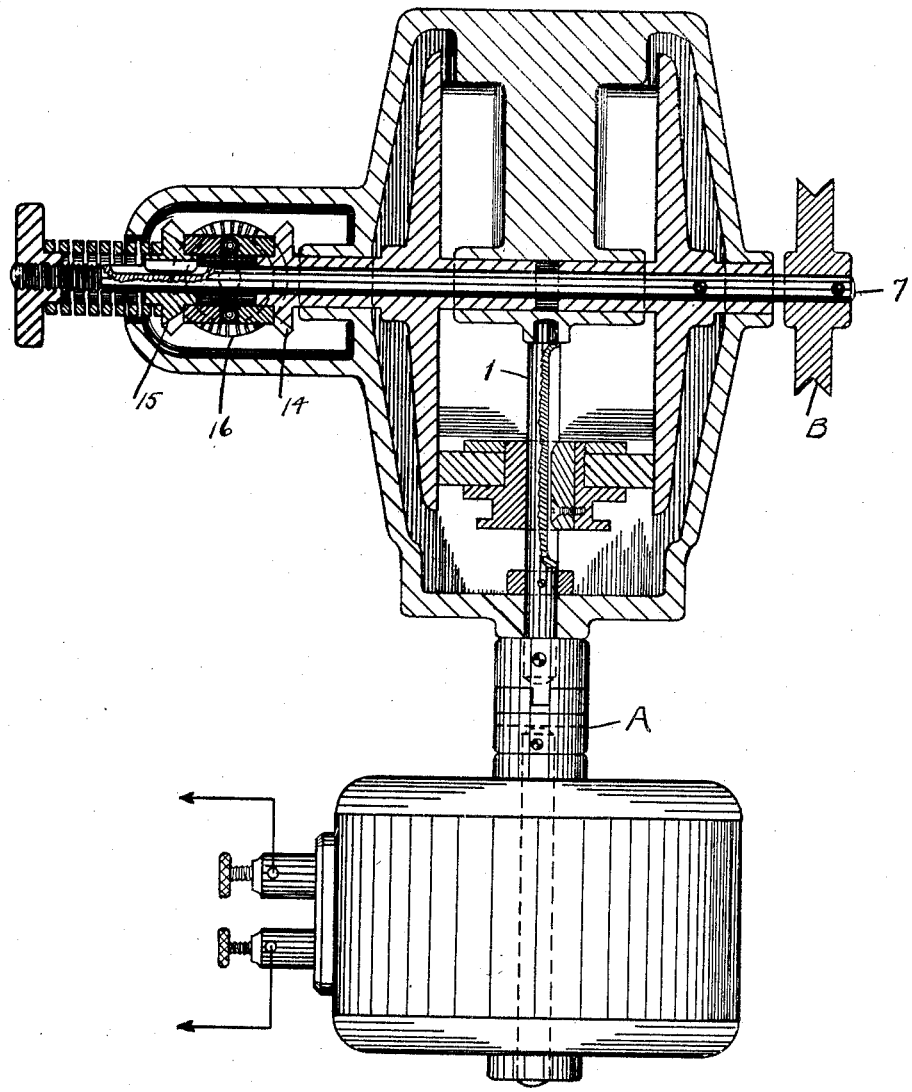
Fig. 2 is a horizontal cross-section through another type.

As shown in Fig. 2, I provide the same device with a gearing for high power drives, since one disk revolves in the opposite direction. I provide a gear 14 on the tubular extension of disk 6 (which can be of one piece with the gear 14). Another gear 15 takes the place of sleeve 10, but is provided with a key, the same as sleeve 10. An idler gear 16 is mounted between gears 14 and 15 and meshes therewith. The gear 16 is mounted upon spindle 17 (see Fig. 3) and supported by a floating bearing 18 so that the gear 16 can also follow any side motion of the gears 14 and 15. Two thrust ball races are mounted the same as in Fig. 1, but in this case they are between the gears 14 and 15 (it is however clear that the shaft 17 could be used to drive some device or machine.)

Now the next function of my device that I shall describe in detail is: the quick shifting of the pulley 3 and holding it instantly and firmly in such position. The pulley 3 has a groove 3<sup>b</sup> which is engaged by a fork 19, which fork 19 is mounted upon a bar 20 and slides thereon. The fork member 19 has a tubular extension 19<sup>a</sup> and on the end thereof a slotted bracket 21. The bracket 21 is engaged by pin 22<sup>a</sup> which is fastened in the lever 22. The lever 22 is mounted upon the lever shaft 23, which has a flat rectangular end extending into the slot of the shaft 24 upon which is mounted the graduated knob 25. The notches 25<sup>a</sup> on the knob 25 are engaged by the lock member 26 forming the index finger. Before the knob 25 can be operated it must be depressed thereby disengaging the lock member 26. By revolving the knob 25 and the shafts 24 and 23, the lever 22 will slide the parts 21, 19 and 19<sup>a</sup> upon the bar 20, thereby shifting the pulley 3 from or toward the center of disks 5 and 6 (the spring 27 pressing upon the collar 28, which is fastened upon shaft 24 forces the shaft 24 and knob 25 upward to the locked position whenever the knob 25 is released after each operation thereof). The bar 20<sup>a</sup> is only provided as an additional support for the parts 21, 19<sup>a</sup> and 19. The part 26 is mounted upon a tube 29, which tube is mounted upon a hub extension of the upper part of casing 2.

I shall now describe the operation of the part that will enable the operator to cut off the driving power from the disk and also enable him to reëngage them again at the same speed position they were under before the disconnection took place: In the upper part of casing 2 there is mounted a revoluble lever 30, which is slightly longer than the distance between the disks 5 and 6. When the lever 30 is brought in a 90° alinement with the disks 5 and 6 they then have been slightly pressed apart and they no longer are in contact with the pulleys 3 and 3<sup>a</sup>, and consequently they do not revolve any longer, and when the member 30 is brought out of contact with the disks then they will again touch the pulley 3 and be revolved and driven thereby. To operate the member 30 I provide that the member 30 is extended through the casing 2 and the tube 29 up to and above member 26, and on this end of member 30 is mounted a lever 31 adapted for convenient operation.

I have employed this device for operating motion picture apparatus and have found it to be a great convenience and improvement over devices of this kind formerly employed for this purpose.

What I claim as my invention is:

1. The combination with a constant speed driving shaft and a variable speed shaft to be driven located at right angles thereto, of a pulley mounted on said driving shaft, a disk secured to said driven shaft and bearing against one peripheral edge of said pulley, a second disk loosely mounted on said driven shaft, and bearing against the opposite peripheral edge of said pulley, a spring normally tending to draw said disks toward each other, means to adjust the tension of said spring, means for moving said disks out of contact with said pulley, and means for shifting said pulley on said driving shaft.

2. The combination with a constant speed driving shaft and a variable speed shaft to be driven located at right angles thereto, of a pulley mounted on said driving shaft, a disk secured to said driven shaft and bearing against one peripheral edge of said pulley, a second disk loosely mounted on said driven shaft, and bearing against the opposite peripheral edge of said pulley, means normally tending to draw said disks toward each other, means for moving said disks out of contact with said pulley, and means for shifting said pulley on said driving shaft, and means controlled by the pulley shifting means for indicating the speed of rotation of said driven shaft.

3. The combination with a constant speed driving shaft and a variable speed shaft to be driven, located at right angles thereto, of a pulley mounted on said driving shaft, a disk secured to said driven shaft, and bearing against one peripheral edge of said pulley, a second disk loosely mounted on said driven shaft and bearing against the opposite peripheral edge of said pulley, and means for normally tending to draw said disks, toward each other, means for moving said disks out of contact with said pulley, and means for shifting said pulley on said driving shaft, and means controlled by the pulley shifting means for indicating the speed of rotation of said driven shaft.

Signed at the city of New York, New York, this 27th day of April, one thousand nine hundred and seventeen.

WILLIAM WENDERHOLD.